United States Patent
Ward

(10) Patent No.: US 7,244,908 B2
(45) Date of Patent: Jul. 17, 2007

(54) WIRE FEED SPEED AND CURRENT ADJUSTABLE WELDING TORCH WITH REMOTE SELECTION OF PARAMETERS

(76) Inventor: Joseph J. Ward, 221 Independence Ct., Collegeville, PA (US) 19426

( * ) Notice: Subject to any disclaimer, the term of this patent is extended or adjusted under 35 U.S.C. 154(b) by 380 days.

(21) Appl. No.: 11/018,071

(22) Filed: Dec. 21, 2004

(65) Prior Publication Data

US 2005/0103768 A1 May 19, 2005

Related U.S. Application Data

(63) Continuation-in-part of application No. 10/263,034, filed on Oct. 2, 2002, now Pat. No. 6,841,752.

(60) Provisional application No. 60/326,542, filed on Oct. 2, 2001.

(51) Int. Cl.
*B23K 9/10* (2006.01)
(52) U.S. Cl. .................................. 219/132; 219/137.71
(58) Field of Classification Search ................ 219/132, 219/130.5, 137.71
See application file for complete search history.

(56) References Cited

U.S. PATENT DOCUMENTS

| 4,430,551 A | * | 2/1984 | Toth ........................... 219/132 |
| 4,510,373 A | * | 4/1985 | Cox et al. .............. 219/137.71 |
| 4,608,482 A | * | 8/1986 | Cox et al. .................... 219/132 |
| 4,973,821 A | * | 11/1990 | Martin ........................ 219/132 |

* cited by examiner

*Primary Examiner*—Clifford C. Shaw
(74) *Attorney, Agent, or Firm*—Robert B. Famiglio; Famiglio & Associates

(57) ABSTRACT

An arc welding torch control system providing remotely selectable control over welding wire feed rate and welding current without discontinuing use of the welding device. A torch mounted three position switch provides for selection of variable wire feed rate with constant preselected current control, variable current control with a preselected constant wire feed rate, or simultaneous variation of both parameters over a given preselected range. Control of the selection and parameter range control is remotely presented to the welding operator by use of torch mounted controls or by remote controls co-located in the immediate location of with the welding torch so that the operator can manipulate the rate of the selected parameter by foot or otherwise without the need to discontinue the welding operation.

2 Claims, 4 Drawing Sheets

WIRE FEED SPEED AND CURRENT ADJUSTABLE WELDING TORCH WITH REMOTE SELECTION OF PARAMETERS

CROSS REFERENCES TO RELATED APPLICATIONS

This application is a continuation-in-part of the applicant's pending application Ser. No. 10/263,034 filed Oct. 2, 2002 now U.S. Pat. No. 6,841,752, which claims the benefit of the applicant's provisional application Ser. No. 60/326,542 which was filed Oct. 2, 2001.

BACKGROUND OF THE INVENTION

1. Field of the Invention

The present invention relates to arc welding apparatus, and more particularly to TIG and to MIG welding apparatus wherein welding wire feeding speed and welding current may be selectably adjusted and controlled through a single point of activation such as a trigger attached to the welding torch handle. The present invention also provides a means for a welding torch operator to control the current, wire feeding speed, or both selectively from a location remote from the main current control and wire speed control through a single point of control by selecting the preferred variable parameter from a control on the welding torch.

2. Description of the Related Art

TIG welding is used for welding all types of metals in a wide variety of fields, such as manufacturing, ship building, pipe fitting or any other metal work. TIG welding techniques are well known, and typical apparatus uses a manual TIG torch wherein an arc is generated between the torch electrode and the base metal, and a welding wire is applied to feed material into the seam being welded during the welding operation. TIG welding techniques require the torch operator to hand feed wire material, presently most commonly available in 3/32", 1/8" and 5/32" diameters. A typical welder may cut the wire into strips of approximately three feet so that the wire may be conveniently hand manipulated and not be of excessive weight or be of an unmanageable size.

Another common type of welding torch is a MIG torch which has an automatic wire feed mechanism wherein the wire also serves as the welding electrode or tip. The arc is generated between the automatically fed wire which protrudes through the center of the welding torch head and supports an arc between the wire and the object being welded. While such apparatus does provide for an automatic wire feed through the center gas cup of the torch, the apparatus is not portable, the welding torch head cannot be remotely located more than perhaps twenty-five feet from the welding machine or apparatus, and the MIG system provides other disadvantages.

Present TIG welding tools do not provide for an automatic or integrated application of welding wire to an existing TIG torch and torch handle, or for adjustability of the speed of the wire being fed to the head of the torch. Existing MIG types of welding equipment requires that the operator discontinue the welding operation and then adjust the rate of delivery of the material wire to a more suitable speed. Generally, this requires the operator to reach for a control panel which may or may not be located in close proximity to the work being performed.

Present equipment available today, which provides for automatic wire feed in a TIG torch operation, usually requires more than one operator, who must be specially trained, to operate large, expensive welding systems that cannot be adapted to any standard TIG torch or welding machine. An example of what may be found in the prior art is disclosed in U.S. Pat. No. 5,789,717, issued to Imaizumi et al for a Semi-Automatic TIG Welding Apparatus. This patent teaches an apparatus to feed welding wire to the vicinity of the arc tip of the welder and presents the wire material through the welder handle grip along with mechanisms to feed the other required supply lines as illustrated in the referenced patent. As is evident from the disclosure in Imaizumi, the welding wire feed mechanism is not adapted to be used with existing, conventional TIG touch handles. Imaizuni contemplates an integrated solution to the need for one handed TIG torch operation as is evident by the illustrations and the disclosure in said patent.

None of the equipment found in the existing art provides for a simple, portable means to automatically deliver wire to any standard TIG torch where the operator can continually adjust, regulate or otherwise control the feed speed of the wire being used in the welding process. The existing art does not provide for a simple means to adapt a TIG welding torch with a welding wire feed mechanism which is also capable of wire feed speed control and does not require altering or permanently modifying the existing torch to allow operation.

Both in MIG and TIG welding procedures, typically the current control mechanisms and the wire feed speed controls on a MIG apparatus are located away from the torch location in that the controls are typically mounted on the welding machine apparatus. Since such apparatus is typically located in a position remote from the welding job and the location of the actual torch and operator, it is not convenient to adjust the current controls or wire feed speed. There are welding devices which have taught the use of controls mounted on the welding torch to a limited extend such as the trigger mechanism and adjustable potentiometers mounted on the torch as shown in U.S. Pat. No. 5,595,671 issued to David.

There remains a need for a control system and means to allow the welding torch operator to selectively control either the current applied to the torch, the speed of the wire feed to the torch head, whether operating MIG or TIG apparatus, or both current and wire speed control through activation of a single control such as a trigger or foot petal located on or near the torch. Moreover, the need exists for providing such control in the welding process such that the welder operating the equipment can make such adjustments and control the indicated parameters while in the welding process without the need to stop welding to make the adjustments or return to the location of the welding machine to change parameters.

SUMMARY OF THE INVENTION

The present invention provides a means to adapt a portable wire feed mechanism to a standard MIG torch where the operator can selectably control the speed of delivery of the welding wire as well as the current used in the welding process. The applicant incorporates his pending application Ser. No. 10/263,034 filed Oct. 2, 2002 by reference as though fully set forth. The control scheme disclosed also provides for adjustable use in a MIG torch where the welding wire speed of delivery is typically higher as the welding wire is actually the arc tip used to present current applied in the welding process. The invention provides for a user controlled speed adjustment and/or current adjustment to allow the user of the MIG welding apparatus to increase or decrease the speed of the material delivery to the weld point or adjust the current being used in the process without discontinuing the welding operation. The control device can include a foot pedal, a torch mounted trigger mechanism, or other control means which will allow the operator to increase or decrease the wire material delivery speed or the current used in the process without the need to dedicate one of the operators hands to the speed control device. The invention provides remote control range adjustment of the wire speed or welding current by presenting controls to a panel which itself is located near the welding operator and which can remotely control the range of wire speed and current.

Accordingly, it is the object of the present invention to provide a TIG or MIG welding apparatus control wherein the user can selectively control, through a singular control mechanism, either the wire feeding speed, or the current used, or both in the process of welding while the non-selected parameter remains at a preselected value.

It is also the object of the present invention to provide a means to freely adjust the delivery speed of the welding wire or material simultaneously while conducting a welding operation with either a TIG or a MIG style welding torch by providing such control to the welding torch operator at the location of the operator and in a manner which frees the operator from the need to use a separate hand to control the selected parameters.

It is another object of the present invention to provide a means and apparatus to provide the welding torch operator with the ability to select the control of wire speed and current used in the welding process simultaneously over a preselected range through the use of one control attached the a welding torch with a trigger like configuration or a separate foot petal which controls the selected parameters simultaneously over a preselected range throughout the range of travel of the control device.

It is yet another object of the present invention to provide a means to adjust either the delivery rate of the welding wire or the welding current in a TIG or MIG welding apparatus by manipulation of a user control which is available to the user without discontinuing the welding operation or releasing the welding head handle.

It is a further object of the present invention to provide a means to adjust the speed of the welding wire material delivery and the current used in the welding process simultaneously while conducting the welding operation.

DETAILED DESCRIPTION OF THE INVENTION

And now the invention will be described in detail, with reference to the various figures in which like numerals refer to like parts.

Figure 1:
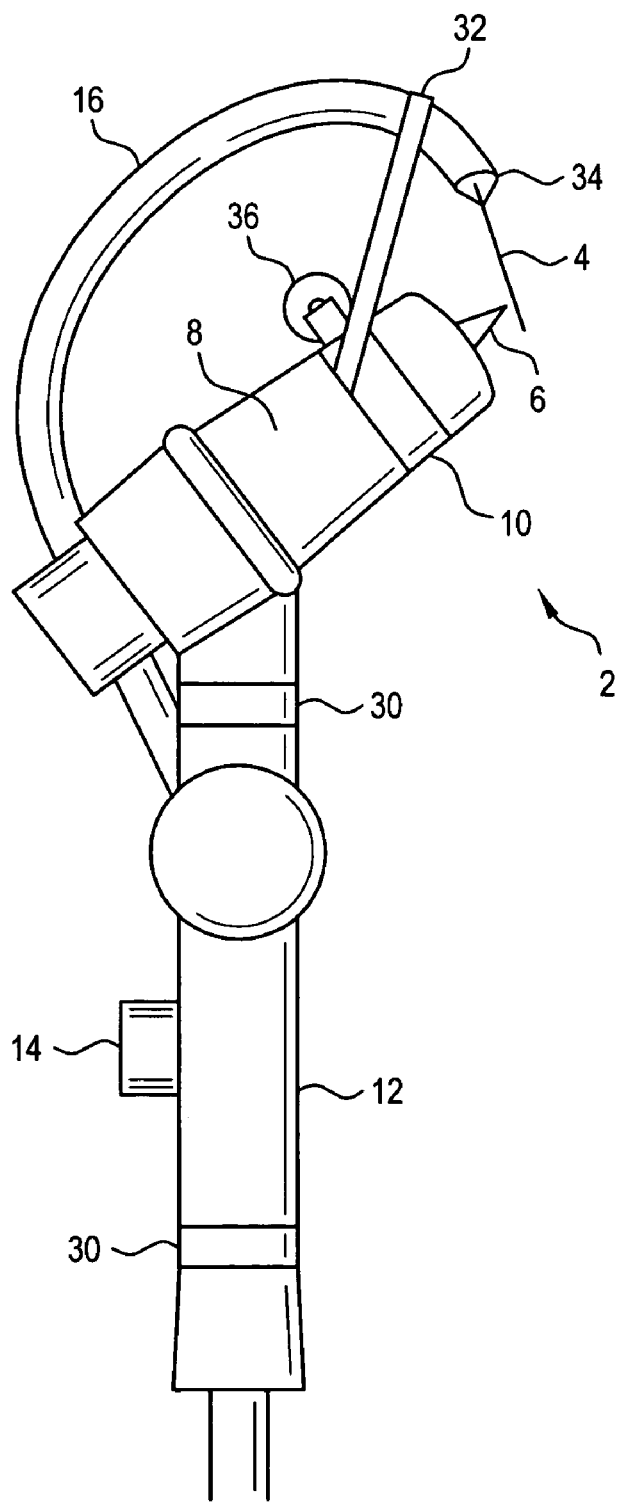
FIG. 1 is a view of the TIG Welding Torch illustrating the wire-feeding curved nozzle attached to a welding torch head at the welding point where the material wire is delivered in the proximity of the arc welding electrode.

Turning now to FIG. 1, a TIG Welding Torch 2 is shown in a conventional configuration, along with a wire feed device attached. Feed wire 4 is delivered through wire feed tube 16 to close proximity of arc tip 6 where an electrical arc causing the welding process initiates. Hyperbaric TIG Welding, also known as Gas Tungsten Arc Welding is widely used as a technique for making the root pass and some subsequent passes in manual hyperbaric welding procedures.

An automatic feed welding torch, sometimes commonly known as a MIG which provides for the automatic feed of feed wire through the center of the gas cup and the wire being fed is used as the arc electrode. The wire in a MIG welder is consumed in the welding process. A MIG welder has a preselected delivery rate of the wire to the joint to be welded. In both MIG and TIG welders, a stream of inert gas, such as argon, is delivered to the weld area through gas cup 8 which assists in evacuating any air containing oxygen from the close proximity to the weld site thereby eliminating certain problems, as is well known to those skilled in the art of arc welding.

In a TIG welding device, the inert gas delivered through handle 12 to the gas cup 8 may be adjusted through valve 14 such as the delivery rate of the inert gas is satisfactory to the operator.

In most existing TIG welders, welding wire is usually applied by hand. The welding operator will normally cut strips of welding wire, most commonly found in the diameters of 3/32", 1/8", or 5/32", into short strips so that they may be manipulated freely by the welder. The welding material wire is applied to the joint and used as welding material which is melted by the arc from the electrode to the grounded metal. Unlike a MIG welding device, electrode 6 in a TIG welding device is not consumed in the welding process and therefore, no automatic wire feed mechanisms have been applied to feed a wire through the center of gas cup 8 in a TIG welding torch. Welding wire used in TIG welding in the above diameter has sufficient stiffness and rigidity to be self-supporting in the strips cut by the welding operator. In existing MIG welders, welding wire is normally supplied in dimensions such as 0.030", 0.035", 0.040" and other similar small diameters. As such, welding wire used in such operations is more highly flexible and does not have the rigidity necessary to allow an operator to feed the wire by hand using a TIG torch.

The present invention provides for a means to utilize an automatic wire feed mechanism, as shown in FIG. 1, which also allows for an adjustment of the speed of delivery of wire 4 through tube 16. The wire feed speed of a MIG torch is pre-selected by the operator usually by control on the welding apparatus or separate wire feeding apparatus typically either co-located with the welding machine, or may be apparatus located separately and is not adjustable in the welding process. If the operator of a MIG welding device desires to change the delivery rate of the material wire, typically he would stop the welding operation, move to the control device on the welding machine normally located a certain distance from the welding head or torch, and turn the speed up or down. In a MIG machine, because of the wire feed mechanism and the fact that the wire also is the electrode for carrying the current to conduct the welding operation, the welding torch head cannot be further than approximately than twenty-five feet from the welding apparatus. Otherwise, malfunctions occur, there are practical problems in the wire feed mechanism because of longer distances, and the results have been generally unsatisfactory. In a TIG welding machine, torch 2 can be, and is frequently located many hundreds of feet from the welding machine itself. A gas line and electric current wire are routed from a typical welding machine up through a structure or job where the welding operation is being conducted. A welding operator will carry welding wire to the site of the welding operation and conduct the welding in a conventional fashion.

With the present invention, however, a portable device the size of approximately a briefcase or catalog case can contain a spool of welding wire of the desired size, adopted to be fed through a wire feeding device driven by a simple electric, speed controlled motor. The device can operate on conventional 120 volt power or 12 volt portable battery power and may be co-located with the welding torch 2 at the location of the welding operation. The present invention, in the preferred embodiment, provides a speed control pedal 26 which may be remotely located from the wire spool or the automatic feed equipment so that the operator of welding torch 2 can increase or decrease the delivery speed of the wire material while continuing the welding process.

Figure 2:
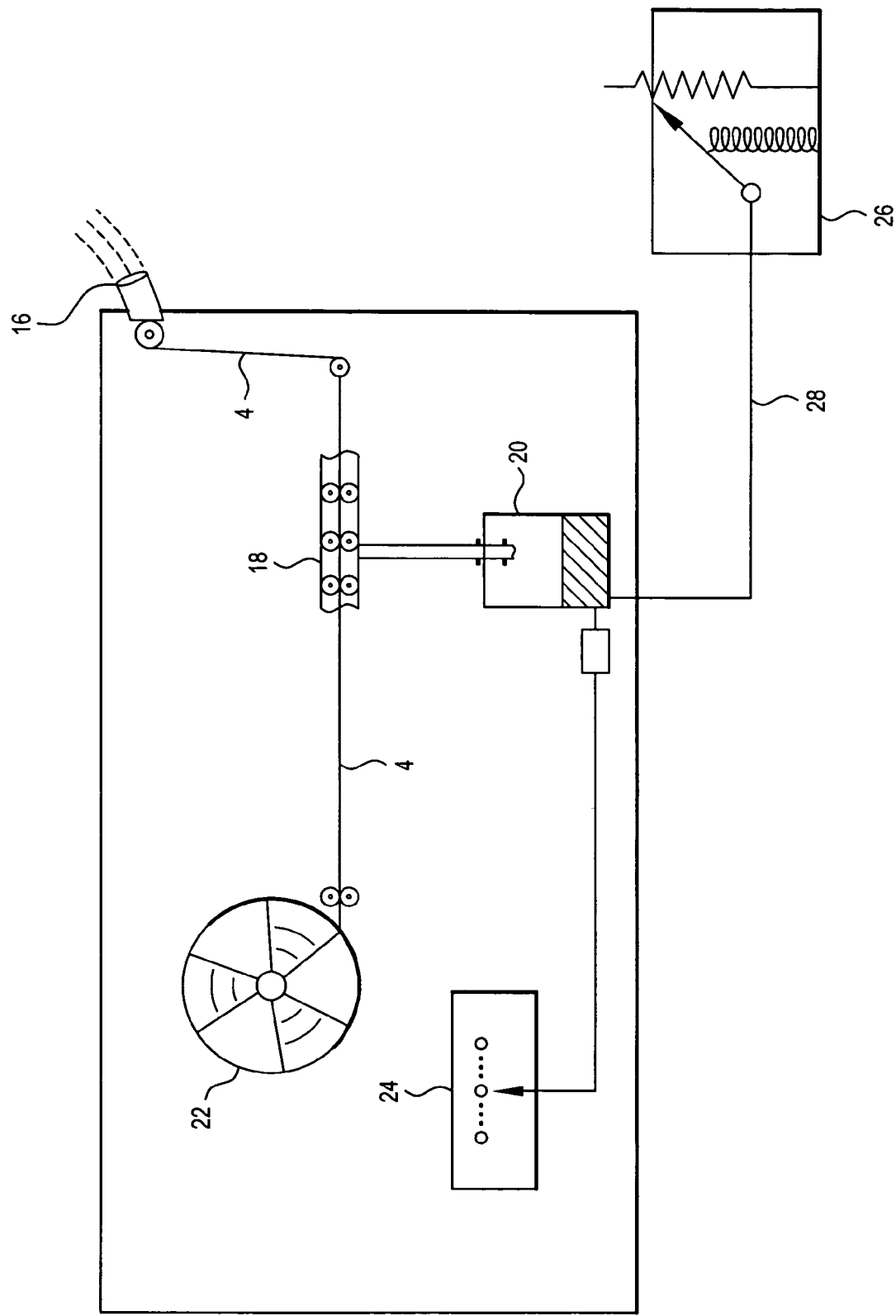
FIG. 2 is a diagram showing a simplified embodiment of the apparatus which controls the feeding of welding wire to the torch utilizing a motor speed control device to provide adjustable delivery rate of the wire spool used in either MIG or TIG welding.

FIG. 2 illustrates the apparatus used in the preferred embodiment. The apparatus as disclosed provides motor 20 which drives wire feed rollers 18. Rollers 18 is a feed device for material wire 4 which allows the transmission of wire 4 through wire feed tube 16 so that the wire may be presented in the area of the welding arc where the material is needed. An important aspect of the invention is the ability of the operator of the device to control the speed of wire 4 utilizing variable motor speed control pedal 26, employing the entire system on an existing TIG welder. Pedal 26, connected to motor 20 by cable 28, presents the control information from pedal 26 to the variable speed control of motor 20. It will be appreciated by those skilled in the art that a simple electric motor can be designed with a variable speed control which allows the motor speed to be continually adjusted while the torque output of the motor remains uniform or constant at any given speed. Variable speed electric drills are commonplace example of the type of motor speed control devices which would function well in the application presented. Much like a variable speed electric drill, it should be appreciated that pedal 26 may also take the form of a thumb or finger controlled trigger which is attached to handle 12 and connected to motor 20 by an external control cable leading to the handle, similar to cable 28 in FIG. 2. In such a fashion, the speed control means represented at 26 in FIG. 2 could take the form of a trigger-like or a button-like control mechanism which provides the same function as pedal 26, but which otherwise allows the operator to control the feed speed of the wire through a hand control rather than a foot control. Different operators will prefer different control configurations depending on the situation and the environment in which the welding operation is taking place.

The welding apparatus shown in FIG. 2 provides internal room for wire spool 22 to present the source of the welding wire 4 to be fed through roller 18. Wire spool 22 is most commonly provided in a four pound spool of welding wire on a plastic reel. As is presently used in MIG welding operations, spool 22 is presently available in a configuration which would lend itself well to a drop-in spool fixture which would allow the rotation of spool 22 about an axis to feed to wire 4 from spool 22 in a conventional fashion shown in FIG. 2.

It is also possible to have a master control speed selector 24 which provides for an overall range of speed to be ultimately controlled by pedal 26. For example, selector 24 can select a speed range from zero inches per minute to one inch per minute delivery rate for wire 4. Other selectable positions may provide for a range of zero inches per minute to three (3) inches per minute or zero per inches per minute to five (5) inches per minute. The wire speed selector provides the ability of the welding torch operator to have a large range of speed variation immediately available, or a slower speed with a more vernier range of control with foot pedal 26. The operator of the welding torch can engage in continual welding operations while adjusting the speed of delivery of wire 4 without switching the torch off or discontinuing the actual process. As described, the invention allows the operator to adjust the speed using a foot control while allowing both hands to be free to manipulate the work and to operate the torch simultaneously. Also, it can be appreciated that pedal 26 may be located at a distance from the wire feeding apparatus so that it is not necessary to operate the welding torch in close proximity to the welding wire material feeding device since pedal 26 is connected through cable 28 which may be of any reasonable length to allow easy movement of the pedal to the area where it is needed.

In order to make the invention available to existing TIG welders, it can be appreciated that the apparatus described in the present invention must attach neatly onto welding head handle 12 and gas cup 8 of torch 2 show in FIG. 1. Clamps 30 are used to attach wire feed tube 16 to any convenient location on torch 2 to allow routing of wire 4 up through, and to the vicinity of arc tip 6. Though FIG. 1 illustrates clamp 30 located in two locations on handle 12, it is not necessary to place clamp 30 on handle 12 if the operator desires to dress feed tube 16 away from torch 2 in a different area or direction.

Wire tube hanger 32, attached to gas cup 8 utilizing gas cup clamp 10, suspends tube 16 in the proximity of the output of gas cup 8 and arc tip 6 as can be seen in FIG. 1. Clamp fastener 36, a thumb wheel design or other type of finger adjustable fastening means provides convenience for the welding operator to adjust the configuration of wire feed tube 16 as may be desired. Wire tube exit tip 34 are similar to the nozzle tips used on existing MIG welding torches which allow for wire 4 to fit though the center of tip 34 when exiting wire tube 16. Tip 34 is sized to correspond to the wire size desired by the welding operator. For example, if using welding wire sized at 0.035", tip 34 would provide a center opening which corresponds to use of such wire size so that wire 4 would travel neatly through the tip opening when being driven through tube 16 by the motor driven rollers 18 shown in FIG. 2.

It can also be appreciated that wire tube hanger 32, affixed to torch 2 may be adjustable such that the distance between arc tip 6 and the end of wire 4 can be more easily controlled by the welding torch operator. Clamp fastener 36 can be of a thumbwheel control design such that manipulation of fastener 36 can control the spacing between arc tip 6 and wire 4 by ultimately causing slight movement in tube hanger 32 as shown in FIG. 1. Essentially, with manipulation of fastener 36 can control the distance between the arc being delivered to the weld site and welding wire 4 as it is presented to the point where welding is occurring.

It should also be appreciated by considering the description and the Figs of the invention that speed control pedal 26 may be remotely located on welding head handle 12 so that the operator of torch 2 may adjust the speed of the delivery of welding wire 4 using a finger control such as those found on continuously adjustable speed drills or other hand tools. This would be advantageous in a welding operation where the welder was not in a convenient position to utilize a foot pedal such as earlier suggested.

The device shown in FIG. 2 may be configured in any convenient package which allows portability and co-location of the wire feed device in the general vicinity of the welding operation. Thus, the user of a TIG welding apparatus, located many hundreds of feet from the welding machine, may carry the wire feed mechanism to the location and within several minutes attach wire feed tube 16 to torch 2 as show in FIG. 1. With the above it has been demonstrated the concept and practical application of a wire feed, speed adjustable welding torch accessory which allows retro fitting an existing TIG torch for automatic feed with "hands free" operation.

Other useful adaptations of the present invention further include use of other attachment means to affix a welding wire feeding tube mechanism to an existing TIG torch handle. It can also be appreciated that adaption of a remote motor speed control means to adjust the feed speed of the welding wire could employ wireless control means, including infrared, radio frequency or other remote control means which are employed in control of a variety of consumer and commercial appliances and devices. Using such short range electronic speed control means would eliminate the need for control wires to be connected from the speed adjustment control device to the location of the apparatus containing the wire feed mechanisms. The control of the speed of the rate of wire delivery can be further adapted to use in either TIG or MIG welding by adapting the remote speed control means described above and adding means to control welding current as well as selection of the parameter to control.

Figure 4:
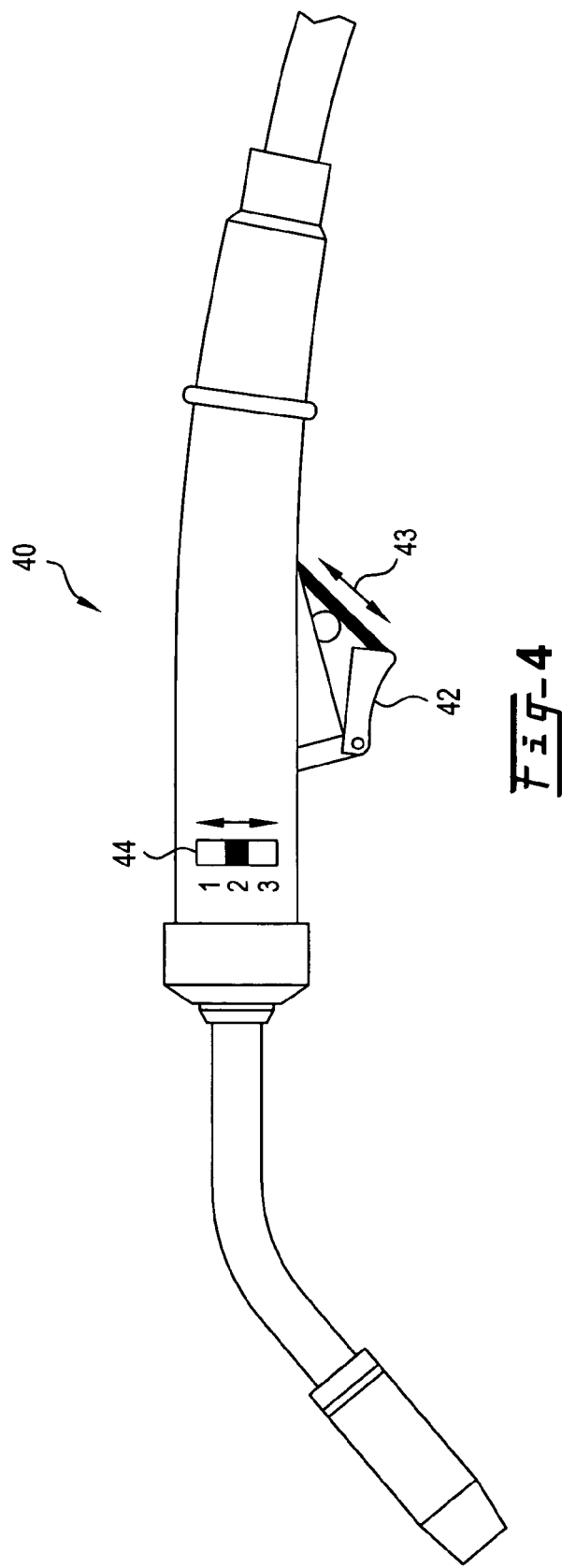
FIG. 4 is a pictorial diagram of a typical welding torch used in MIG welding disclosing a typical location of a selector switch, to select remote control of current and wire feed speed adjustment and a configuration of a control trigger mounted on the torch body.

The general design and improvement described above can be further applied to enhance both TIG welding and MIG welding apparatus by providing means to selectively control either the welding current, the welding wire feed speed, or both through selectively enabling a single remote control in the form of a trigger mechanism on the welding torch or otherwise as a remote control device in the form of a foot pedal located at the site of the welding job. Turning to FIG. 4, the preferred embodiment of the invention provides for a three position selector switch 44 to select one of three modes of remote parameter control at the discretion of the welder. Switch 44 is mounted on MIG torch 40. Trigger control 42 is a potentiometer variable over a given range. Depending on whether switch 44 is in the first, second or third position, the trigger control can adjust either wire speed feeding rate with a preset current selected at the remote current control 54, current control over a preset range with the wire feed rate preset on the remote speed control 56, or can control both parameters simultaneously as trigger 44 travels over its range of operation. In this latter scenario the trigger 44 increases current and wire feed rate simultaneously over a range preset by current and wire speed controls 54 or 56. Relay 52 can be selected by switch 44 to select fixed current set by welding current control 54 or to vary current control through trigger 42 located on torch 40. Relay 50 is selected by switch 44 in an alternate mode to provide motor speed control to either control 56 or trigger control 42 mounted on the welding torch as shown in FIG. 4.

An improvement is realized in the enhanced control afforded to the welding process by providing alternate operation modes to the torch operator selectable immediately at the torch by switch 44 which can be manipulated at the welding site without stopping the welding process to change control settings at a welding machine. Such machines frequently are located at some distance from the welding operations. Further, the operator now has virtually instant selection of current control, with constant wire feed rate, wire feed rate control with constant current delivery, or control of both through a single trigger control range, all depending on what mode is selected by the torch operator. Moreover, as illustrated in FIG. 3, the consolidation of wire speed and current controls presented in control panel 62 allows convenient adjustment of the welding parameters from the location where torch 40 is in use.

Figure 3:
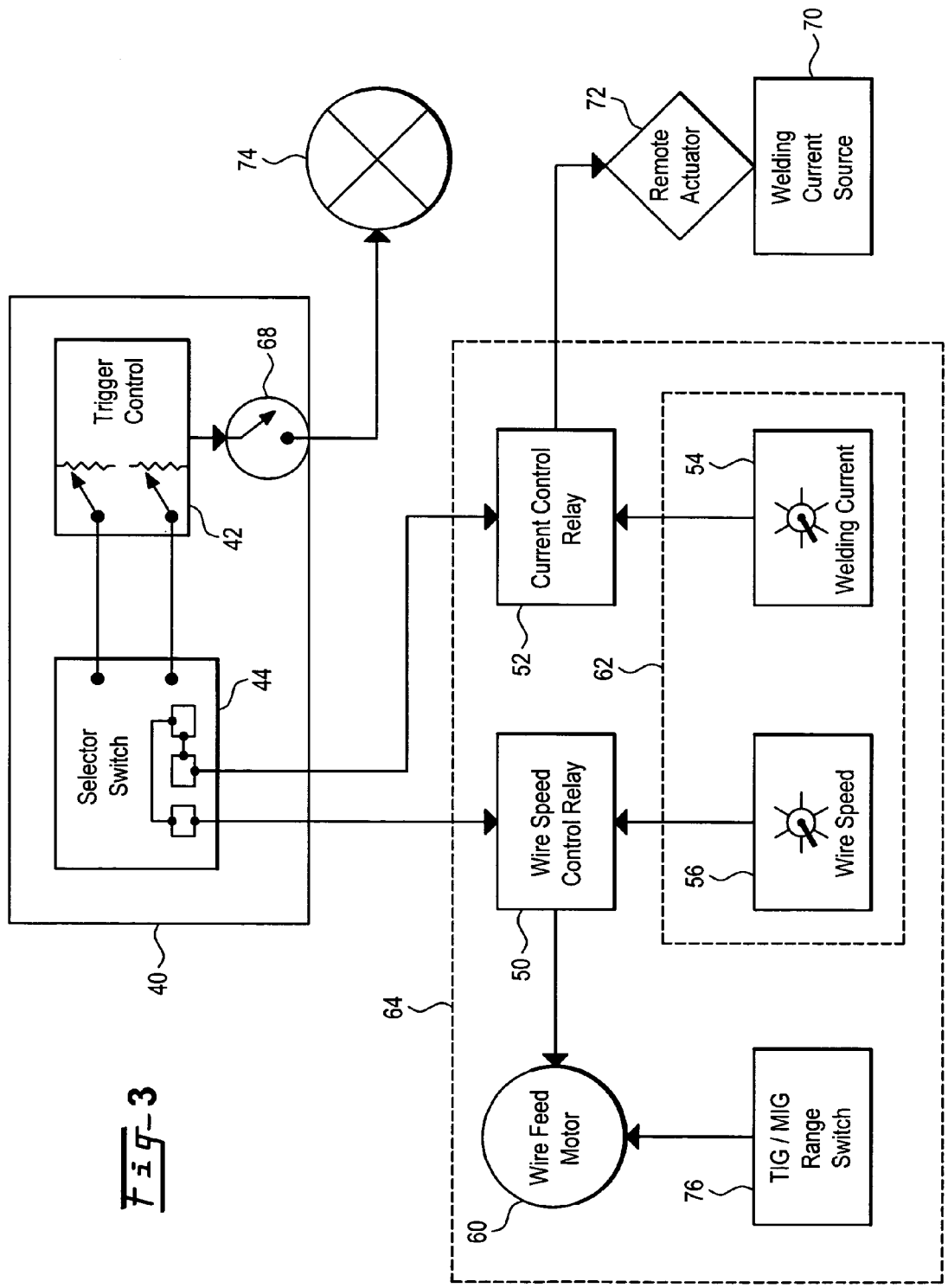
FIG. 3 is a block diagram of a control system to provide for torch mounted alternate selection of remote control of wire feed speed, current adjustment, or both parameters over a preselected range of values.

FIG. 3 presents a preferred embodiment of the present invention which suggests the most favorable configuration of the disclosed welding apparatus within the objectives of the invention. FIG. 3 discloses, in block diagram form, torch 40 on which is configured switch 44 and trigger control 42. Trigger 42 is a variable control device such as a potentiometer or other device capable of adjusting voltage or current over the range of travel of trigger 42 shown as 43 in FIG. 4. As trigger 42 is manipulated by the welding operator, it may control welding current or welding wire feed speed depending on the position of selector switch 44. Switch 44, a three-position switch in the preferred embodiment, selects either control of the wire feed speed, welding current control or both simultaneously depending on the operator's preference. Trigger 42 also optionally contains a switching means 68 which is activated upon release of all pressure on trigger 42 such as to control a gas valve solenoid 74 which may be used to shut off the inert gas being used in the welding process.

It can be appreciated by those skilled in the art that switch 68 can be a micro switch, or even configured as a double pole switch which simultaneously can be used to close gas valve solenoid control 74 as well as serve as an override to the wire speed control while also serving as a safety current override switch. The threshold activation of switch 68 can be configured such as to activate at a preferred position of travel of trigger 42 along its travel range 43 shown in FIG. 4. When an operator selects wire speed control through switch 44, speed control relay 50 is activated, switching speed control of wire feed motor 60 to trigger 42, although the total range of wire speed can still be set by wire speed control 56 on control panel 62. When selector switch 44 selected for wire speed control, trigger 42 will vary from no wire feed to the maximum speed selected by wire speed control 56 as the welding operator manipulates trigger 42 over its range 43.

Similarly, should the operator desire control of the welding current instead of the welding wire speed, switch 44 selects this option in its second position, thereby activating current control relay 52. Trigger 42 then is selected to control the current being applied to the welding torch over a preselected range, normally from 0 amps to whatever maximum current is selected by welding current control 54 located on panel 62. As is depicted in FIG. 3, a typical arc welding machine has a current source in the welding machine usually located some distance from the actual welding torch and connected to the torch through a cable. Welding machine current source 70 would have a high current cable attached to the welding torch depicted in FIG. 4, though not shown for clarity in FIG. 3. Such welding machines normally have a current control located on their own panel or casing, and operators normally would return to the welding machine to change or adjust the current being used in the welding process. Welding machine current source 70 in the present invention, is supplemented with a remote current control, being remote actuator 72 as shown.

It would be impractical to provide high current control directly through the actual trigger 42 if selected as can be appreciated by one skilled in the art. Therefore, when selector switch 44 activates current control relay 52 to select control of welding current through trigger 42, activation of trigger 42 through relay 52 controls the actuator 72 which allows for remote control of the current adjustment on welding machine current source 70. Actuator 72 can be of a solenoid type or a motorized potentiometer driving the current controller found in welding current source 70. When selector switch 44 is selected for current control only, wire speed control relay 50 is deactivated, thereby providing that the wire feed speed of motor 60 controlled by selection of wire speed control 56.

A third mode of operation is provided by selector switch 44. In the third selected position, selector switch 44 commands variable control of both the wire speed feed and welding current by selecting both relay 50 and relay 52 to revert control of wire feed motor 60 and remote actuator 72 to trigger 42. Accordingly, as the welding operator manipulates trigger 42 the speed of motor 60 and the welding current are varied over the preset range, usually from values of zero in both instances to a maximum preset value of the wire feed speed and the welding current made available in the process.

The present invention can be configured with a device which may be retrofitted to existing welding apparatus. It will be appreciated that wire feed motor 60, control relays 50 and 52, as well as wire feed speed control 56 and the welding current control 54 can be placed in a remote unit housing 64. Also, to allow for the maximum flexibility of the present invention, the preferred embodiment contains a speed selector switch 76 which allows the unit to be used in the TIG welding process or the MIG welding process by changing the range of wire feed motor 60. As described above, the various arc welding processes use entirely different ranges of wire feed in the welding process. Accordingly, it is advantageous to provide for a master range switch 76 which presents a recalibration of wire speed control 56 depending on the needs of MIG welding or TIG welding as earlier described.

The remote unit housing 64 can be connected to the welding current source and to the torch through commonly used multiple pin connectors or other suitable industrial electrical connectors, thereby providing for interchangeability and retrofitting of the present invention with existing TIG torches and MIG torches.

It can further be appreciated that trigger 42, while most convenient when located on torch 40, can be remotely located by a foot pedal or other external switch such as that suggested in FIG. 2 in controlling the motor. By adopting such mechanisms and means to replace the trigger control 42, the torch operator can manipulate selector switch 44 as he controls the desired parameter through a foot switch or other mechanism which allows continuous variable control of the selected parameter without the use of a trigger attached to torch 40. Further, as an option for retrofitting a torch such as shown in FIG. 4, it can be appreciated by those skilled in the art that selector switch 44 need not be integrated into the housing of torch 40 but may be fixed to the torch body or to another convenient location in which the operator of the welding torch can still conveniently select a desired parameter for variable control.

Although the invention has been described in terms of the preferred embodiment and with particular examples that are used to illustrate carrying out the principals of the invention, it would be appreciated by those skilled in the art that other variations or adaptations of the principal disclosed herein, could be adopted using the same ideas taught herewith. Such applications and principals are considered to be within the scope and spirit of the invention disclosed and are otherwise described in the appended claims.

What is claimed is:

1. Apparatus for remote control of welding wire feeding speed and welding current parameters in a welding device comprising:

A welding torch including a variable trigger control and switching means to select which said parameter is varied by said trigger control;

a wire speed control relay operatively connected to said switching means and said wire feed speed control, a current control relay operatively connected to said switching means and said welding current control;

a master wire speed controller operatively connected to said wire speed control relay;

a master welding current controller operatively connected to said current control relay;

wherein said switching means selectively engages either said variable wire speed feed control, said variable welding current control, or both to be controlled by said variable trigger control;

wherein further the non-selected control is fixed to a preselected value set by said master wire speed and said current control.

2. Welding apparatus comprising:

A welding torch of the type utilizing welding wire and a current arc in the welding process;

a variable control trigger means configured on said torch to selectively control wire feed speed and welding current supplied to said torch;

selection means located on said torch to select control of wire feed speed and welding current;

a wire speed control relay operatively connected to said selection means and a wire feed motor to supply welding wire upon activation of said trigger means;

a welding current control relay operatively connected to said selection means to select between a preset current or control of welding current by said trigger means;

wherein said selection means alternatively enables said trigger means to variably control wire feed speed with constant preselected welding current; welding current with constant preselected welding wire feed speed; or both wire speed feed and welding current over preselected ranges.

* * * * *